United States Patent
Cronin et al.

(10) Patent No.: US 11,636,792 B2
(45) Date of Patent: Apr. 25, 2023

(54) RECONFIGURABLE USER DEVICE SCREEN COMPENSATING PROBLEMATIC SOURCES OF REFLECTION

(71) Applicant: Nokia Technologies Oy, Espoo (FI)

(72) Inventors: Harry Cronin, Cambridge (GB); Christopher Wright, London (GB); Phil Catton, Cambridge (GB); William Schnabel, Surrey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/680,769

(22) Filed: Feb. 25, 2022

(65) Prior Publication Data
US 2022/0277678 A1 Sep. 1, 2022

(30) Foreign Application Priority Data
Mar. 1, 2021 (EP) ..................................... 21159818

(51) Int. Cl.
*G09G 3/00* (2006.01)
*G06F 3/01* (2006.01)

(52) U.S. Cl.
CPC ............ *G09G 3/035* (2020.08); *G06F 3/013* (2013.01); *G09G 2340/14* (2013.01); *G09G 2354/00* (2013.01); *G09G 2360/144* (2013.01)

(58) Field of Classification Search
CPC ............... G09G 3/035; G09G 2340/14; G09G 2354/00; G09G 2360/144; G09G 5/10; G06F 3/013; G06F 21/84; G06V 40/193
See application file for complete search history.

(56) References Cited

U.S. PATENT DOCUMENTS

| | | | |
|---|---|---|---|
| 9,812,074 B2 | 11/2017 | Phillips | |
| 9,858,848 B1* | 1/2018 | Bhageria | G06F 21/84 |
| 2008/0137944 A1* | 6/2008 | Marchesotti | G06V 40/193 |
| | | | 382/167 |
| 2012/0229487 A1 | 9/2012 | Samanta et al. | |
| 2015/0091792 A1 | 4/2015 | Koo | |
| 2016/0166140 A1 | 6/2016 | Lawrenson et al. | |
| 2017/0351929 A1* | 12/2017 | Kim | G09G 5/10 |
| 2017/0358252 A1* | 12/2017 | Bhageria | G06F 21/84 |
| 2018/0082632 A1 | 3/2018 | Lee | |
| 2020/0258474 A2 | 8/2020 | Ward | |

(Continued)

FOREIGN PATENT DOCUMENTS

| KR | 1020170054056 A * | 5/2017 | ........ H04M 1/72519 |
|---|---|---|---|
| WO | 2012/123864 A1 | 9/2012 | |

OTHER PUBLICATIONS

"Samsung Galaxy Z Fold 2 review: an extravagant success", The Verge, Retrieved on Feb. 25, 2022, Webpage available at: https://www.theverge.com/21427462/samsung-galaxy-z-fold-2-review.

(Continued)

*Primary Examiner* — Richard J Hong
(74) *Attorney, Agent, or Firm* — Squire Patton Boggs (US) LLP

(57) ABSTRACT

A method, apparatus and computer program are described to determine a configuration of a reconfigurable screen of a user device, identify potentially problematic sources of reflection from a scene around a user device based, at least in part, on the determined configuration, and compensate for the potentially problematic sources of reflection.

22 Claims, 7 Drawing Sheets

(56) References Cited

U.S. PATENT DOCUMENTS

2020/0319673 A1  10/2020  Lee et al.
2020/0333607 A1  10/2020  Hatzilias et al.

OTHER PUBLICATIONS

Yi et al., "Faces as Lighting Probes via Unsupervised Deep Highlight Extraction", arXiv, Jul. 21, 2018, pp. 1-42.

Valliappan et al., "Accelerating eye movement research via accurate and affordable smartphone eye tracking", Nature Communications, vol. 11, 2020, pp. 1-12.

"A Day with the Huawei Mate 30 Pro: Kirin 990 and 7680 FPS Slow Motion Tests", Anand Tech, Retrieved on Feb. 25, 2022, Webpage available at: https://www.anandtech.com/show/14897/a-day-with-the-huawei-mate-30-pro-kirin-990-and-7680-fps-slow-motion-tests/4.

Lee et al., "The crease perception in flexible display", Journal of Information Display, vol. 16, No. 2, 2015, pp. 99-104.

Pauchet et al., "GazeForm: Dynamic Gaze-adaptive Touch Surface for Eyes-free Interaction in Airliner Cockpits", Proceedings of the 2018 Designing Interactive Systems Conference, Jun. 2018, pp. 1193-1205.

"Samsung Galaxy Z Fold 2 review", Toms Guide, Retrieved on Feb. 25, 2022, Webpage available at: https://www.tomsguide.com/uk/reviews/samsung-galaxy-z-fold-2-review-pros-and-cons.

"Samsung Galaxy Z Flip Review: A Fun and Fascinating Phone with Just the Odd Crease to Iron Out", Independent, Retrieved on Feb. 25, 2022, Webpage available at: https://www.independent.co.uk/life-style/gadgets-and-tech/news/samsung-galaxy-flip-review-specs-crease-a9398071.html.

"Best Xiaomi phones 2022", Android Central, Retrieved on Feb. 25, 2022, Webpage available at: https://www.androidcentral.com/best-xiaomi-phones.

"TCL Showed Me Its Foldable Phone Prototypes—Now I'm Excited", Slash Gear, Retrieved on Feb. 25, 2022, Webpage available at: https://www.slashgear.com/tcl-foldable-concepts-hands-on-rollable-smartphone-double-fold-tablet-05612200.

"Samsung Galaxy Fold slammed over ugly crease in middle of £1,800 phone's screen", The Sun, Retrieved on Feb. 25, 2022, Webpage available at: https://www.thesun.co.uk/tech/8686415/samsung-galaxy-fold-crease-phone-screen/.

Kuo et al., "Luxapose: indoor positioning with mobile phones and visible light", Proceedings of the 20th annual international conference on Mobile computing and networking, Sep. 7-11, 2014, 12 pages.

"Android 11 Developer Preview 2 is out with support for call screening, hinge angle detection, and more", The Verge, Retrieved on Feb. 25, 2022, Webpage available at: https://www.theverge.com/2020/3/18/21185336/android-11-developer-preview-2-release-shaken-stir-call-screening-hinge-angle-detection.

"Samsung nailed folding screens. Don't expect Apple to follow", Wired, Retrieved on Feb. 25, 2022, Webpage available at: https://www.wired.co.uk/article/samsung-ultra-thin-glass-z-flip.

Extended European Search Report received for corresponding European Patent Application No. 21159818.0, dated Jul. 30, 2021, 7 pages.

* cited by examiner

RECONFIGURABLE USER DEVICE SCREEN COMPENSATING PROBLEMATIC SOURCES OF REFLECTION

RELATED APPLICATION

This application claims priority to the European patent application number 21159818.0, filed on Mar. 1, 2021, the content of which is incorporated herein by reference in its entirety.

FIELD

The present specification relates to reconfigurable screens (e.g. foldable screens) of a user device (e.g. a mobile communication device, such as a mobile phone).

BACKGROUND

User devices have screens that are reconfigurable (e.g. foldable) are known. Reflections that are visible to a user can vary as the screen is reconfigured. Further, screens which are flexible in nature may have undesirable creases or other geometric distortions when used in certain configurations (e.g. flat). There remains a need for further developments in this field.

SUMMARY

In a first aspect, this specification describes an apparatus (such as a controller for a reconfigurable/foldable screen of a user device) comprising means for performing: determining a configuration of a reconfigurable screen of a user device (e.g. a mobile communication device); identifying potentially problematic sources of reflection from a scene around a user device based, at least in part, on the determined configuration; and compensating for said potentially problematic sources of reflection. Different configurations (e.g. fold angles) can cause predictable geometric distortions to certain areas of the user device screen. The potentially problematic sources of reflection may be due to reflections from a non-flat screen region with complex geometry.

The configuration of the reconfigurable screen may comprise a fold angle of said screen. It should be noted that changing the fold angle may change the nature of the geometric distortion of the screen (particularly of a fold about a hinge of the screen). One or more sensors may be provided for determining a fold angle.

In some example embodiments, the means for determining said potentially problematic sources of reflection may comprise means for performing: determining or retrieving (e.g. from a lookup table or some other database) geometric distortion information (e.g. reflection angles that may be of concern) for the screen based on the determined configuration (e.g. based on the fold angle).

The apparatus may further comprise means for performing: determining illumination sources and/or objects impacting on the screen, wherein the means for performing identifying said potentially problematic sources of reflection identifies said sources based, at least in part, on a location of the determined illumination sources and/or objects. The apparatus may further comprise means for performing: identifying potentially problematic reflection areas of the screen based, at least in part, on determined locations of said illumination sources and/or objects. The means for performing determining said illumination sources and/or objects may comprise one or more imaging devices (e.g. cameras). The means for performing determination said illumination sources and/or objects may comprise corneal reflection imaging.

The apparatus may further comprise means for performing: determining an angle and/or a colour of illumination of the determined illumination sources and/or objects relative to the screen for use in identifying said potentially problematic sources of reflection and/or for use in compensating for said potentially problematic sources of reflection.

Some example embodiments further comprise means for performing: determining a gaze direction of a viewer of the screen of the user device. The relative position between the user's gaze point and a distorted screen area may, for example, be used for calculating the light sources requiring correction and for determining the correction required. The means for performing identifying said potentially problematic sources of reflection may identify said sources based, at least in part, on determined user gaze direction. The apparatus may further comprise means for performing: determining a compensation for said potentially problematic sources of reflection based, at least in part, on the determined user gaze direction.

In some example embodiments, the means for performing compensation for said potentially problematic sources of reflection may comprise specular reflection correction.

In a second aspect, this specification describes a user device comprising a reconfigurable (e.g. foldable) screen, wherein the user device comprising an apparatus (e.g. a control module) as described with respect to the first aspect.

In a third aspect, this specification describes a method comprising: determining a configuration of a reconfigurable screen of a user device; identifying potentially problematic sources of reflection from a scene around the user device based, at least in part, on the determined configuration; and compensating for said potentially problematic sources of reflection.

The configuration of the reconfigurable screen may comprise a fold angle of said screen.

In some example embodiments, determining said potentially problematic sources of reflection may comprise: determining or retrieving (e.g. from a lookup table or some other database) geometric distortion information (e.g. reflection angles that may be of concern) for the screen based on the determined configuration (e.g. based on the fold angle).

The method may further comprise: determining illumination sources and/or objects impacting on the screen, wherein the means for performing identifying said potentially problematic sources of reflection identifies said sources based, at least in part, on a location of the determined illumination sources and/or objects. The method may further comprise: identifying potentially problematic reflection areas of the screen based, at least in part, on determined locations of said illumination sources and/or objects. Determination said illumination sources and/or objects may comprise corneal reflection imaging.

Some example embodiments further comprise: determining an angle and/or a colour of illumination of the determined illumination sources and/or objects relative to the screen for use in identifying said potentially problematic sources of reflection and/or for use in compensating for said potentially problematic sources of reflection.

Some example embodiments further comprise: determining a gaze direction of a viewer of the screen of the user device. The relative position between the user's gaze point and a distorted screen area may be used for calculating the light sources requiring correction and for determining the correction required. The method may further comprise:

determining a compensation for said potentially problematic sources of reflection based, at least in part, on the determined user gaze direction.

Some example embodiments further comprise specular reflection correction for performing compensation for said potentially problematic sources of reflection.

In a fourth aspect, this specification describes computer-readable instructions which, when executed by computing apparatus, cause the computing apparatus to perform (at least) any method as described with reference to the third aspect.

In a fifth aspect, this specification describes a computer-readable medium (such as a non-transitory computer-readable medium) comprising program instructions stored thereon for performing (at least) any method as described with reference to the third aspect.

In a sixth aspect, this specification describes an apparatus comprising: at least one processor; and at least one memory including computer program code which, when executed by the at least one processor, causes the apparatus to perform (at least) any method as described with reference to the third aspect.

In a seventh aspect, this specification describes a computer program comprising instructions for causing an apparatus to perform at least the following: determining a configuration of a reconfigurable screen of a user device; identifying potentially problematic sources of reflection from a scene around the user device based, at least in part, on the determined configuration; and compensating for said potentially problematic sources of reflection.

In an eighth aspect, this specification describes: a sensor, such as a hinge angle sensor (or some other means) for determining a configuration of a reconfigurable screen of a user device; a first control module (or some other means) for identifying potentially problematic sources of reflection from a scene around the user device based, at least in part, on the determined configuration (the said first control module may receive inputs from other modules, such as imaging device(s), a scene lighting module, a hinge angle sensor and/or a gaze tracking module); and a/the control module (or some other means) for compensating for said potentially problematic sources of reflection.

BRIEF DESCRIPTION OF THE DRAWINGS

Example embodiments will now be described, by way of example only, with reference to the following schematic drawings, in which.

DETAILED DESCRIPTION

Figure 1:
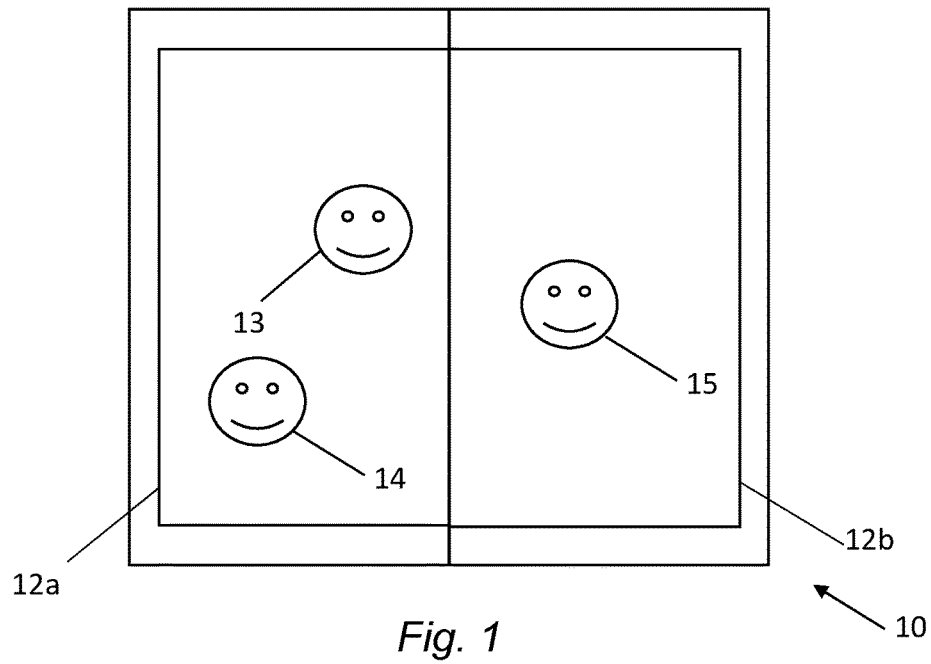
FIGS. 1 and 2 are block diagrams of a user device screen in accordance with example embodiments.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a user device screen 10, in accordance with an example embodiment. The user device screen m may, for example, be a screen of a mobile communication device, a laptop or some other device having a display.

The user device screen 10 comprises a first display segment 12a and a second display segment 12b. In the configuration shown in FIG. 1, the first display segment 12a is folded relative to the second display segment 12b such that the first and second display segments operate as a single flat display. An image displayed using the screen 10 comprises a first face 13 and a second face 14 displayed on the first display segment 12a, and a third face 15 displayed on the second display segment 12b.

Figure 2:
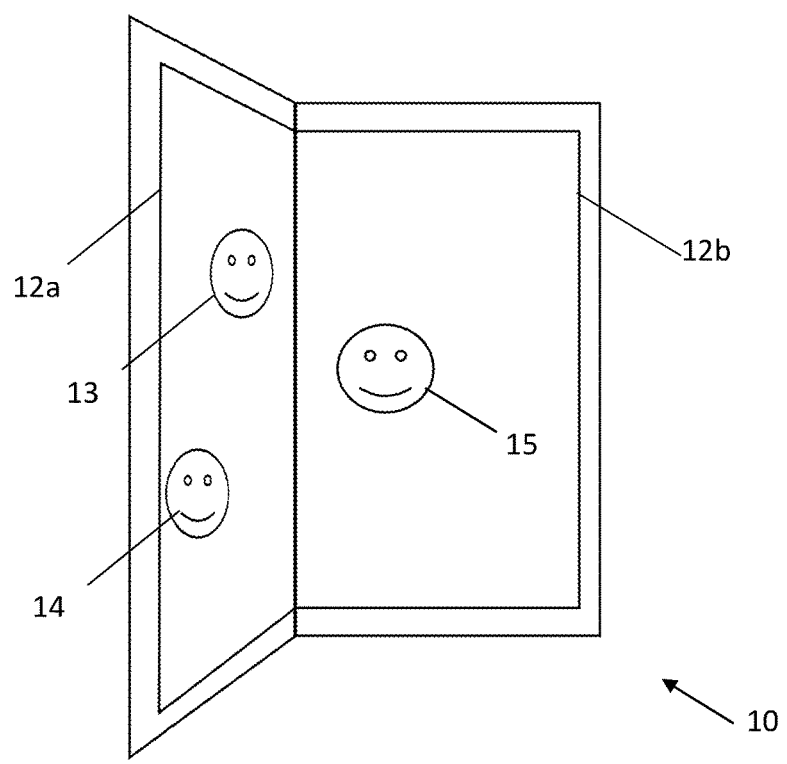

FIG. 2 is a block diagram of the user device screen 10 in accordance with an example embodiment. In the configuration shown in FIG. 2, the first display segment 12a is folded relative to the second display segment 12b such that there is an angle between those displays. The first, second and third faces 13 to 15 remain visible to a viewer.

The folding of a screen, such as the user device screen 10, can result in a visible crease occurring where a part of the screen buckles slightly 10 this would typically occur in the area of the screen above the hinge. Such creases can remain visible even in the flat configuration described with reference to FIG. 1 above.

Figure 3:
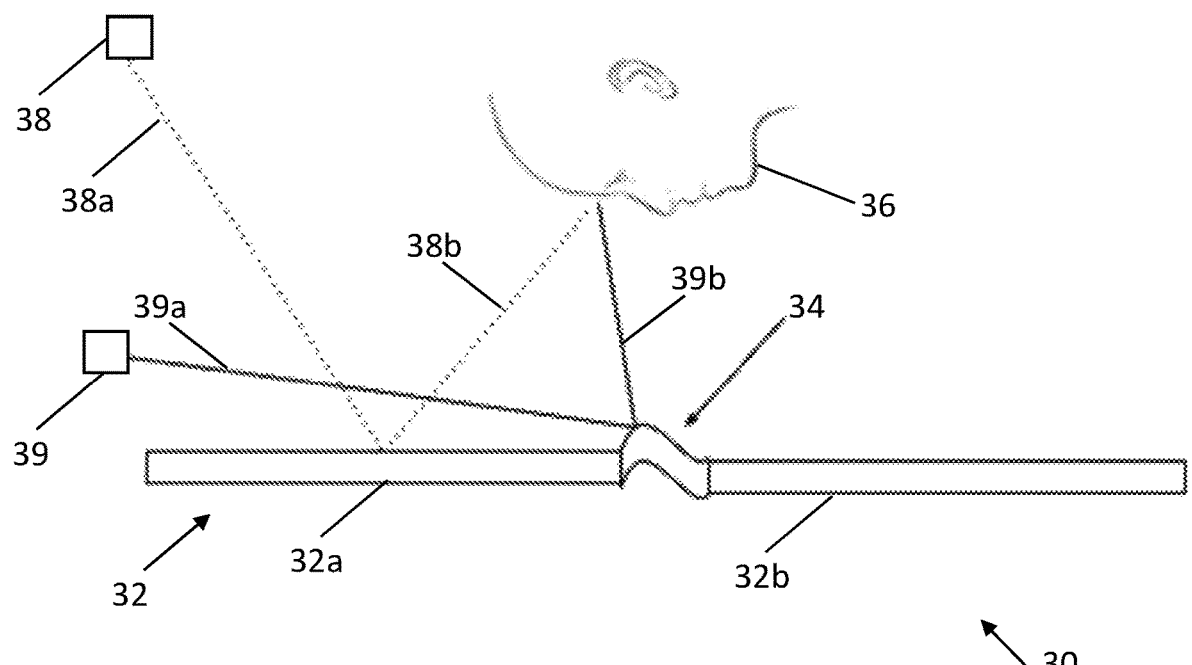
FIG. 3 is a block diagram of a system in accordance with an example embodiment.

FIG. 3 is a block diagram of a system, indicated generally by the reference numeral 30, in accordance with an example embodiment. The system 30 includes a user device screen 32 comprising a first display segment 32a and a second display segment 32b that can be folded relative to one another. In the configuration shown in FIG. 3, the first and second display segments operate as a single flat display. A hinge section 34 is shown between the first and second display segments. A user 36 is shown viewing the user device screen 32.

The hinge 34 shows the sort of buckling that can result in the visible crease discussed above. (It should be noted that the hinge section as shown in FIG. 3 is larger than would be typically occur in most example embodiments so that the buckling of the hinge section 34 is exaggerated for explanation.)

A first light source 38 and a second light source 39 are shown schematically in the scene around in user device 32. Reflections from the first light source 38 are visible to the user 36 due to reflections from the first display segment 32a (as indicated by the dotted lines 38a and 38b). Similarly, reflections from the second light source 39 are visible to the user 36 due to reflection from the hinge section 34 (as indicated by the dotted lines 39a and 39b).

As demonstrated in FIG. 3, geometric distortion as a result of the creased hinge section 34 can result in specular reflections from objects in a scene from an increased range of angles compared with a fully flat screen being noticeable to a user. This may contribute to the visibility of the crease.

Figure 4:
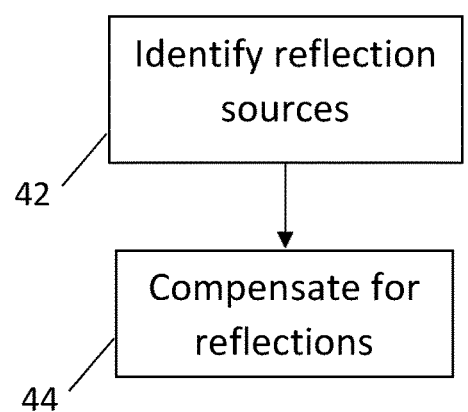
FIG. 4 is a flow chart showing an algorithm in accordance with an example embodiment.

FIG. 4 is a flow chart showing an algorithm, indicated generally by the reference numeral 40, in accordance with an example embodiment.

The algorithm 40 starts at operation 42, where potentially problematic sources of reflection (such as the first and second lights sources 38 and 39 of the system 30) are identified from a scene around a user device.

At operation 44, compensation is performed for said potentially problematic sources of reflection identified in the operation 42. An example of an appropriate compensation would be re-lighting and/or re-colouring the areas of the display which are not affected by the reflection with a colour or brightness matching the perceived version of the reflected light source or object, such that the 'true' scene reflection appears to the user to 'blend' in to the new background.

The operation 42 may be implemented in a number of ways. For example, geometric distortion information regarding the screen may be determined or retrieved (e.g. retrieved from a lookup table or some other database). The geometric distortion information may identify angles from which light sources may be reflected towards the viewer, which further depends on the relative angle between the viewer and the screen. By identifying such angles, potentially problematic sources of reflection can be identified.

As discussed further below, one or more imaging devices (such as cameras) may be used to determine illumination sources and/or objects in the vicinity of a user device screen and potentially problematic reflection areas of the screen can be determined based on the locations of those illumination sources/objects relative to user angle and gaze position.

Figure 5:
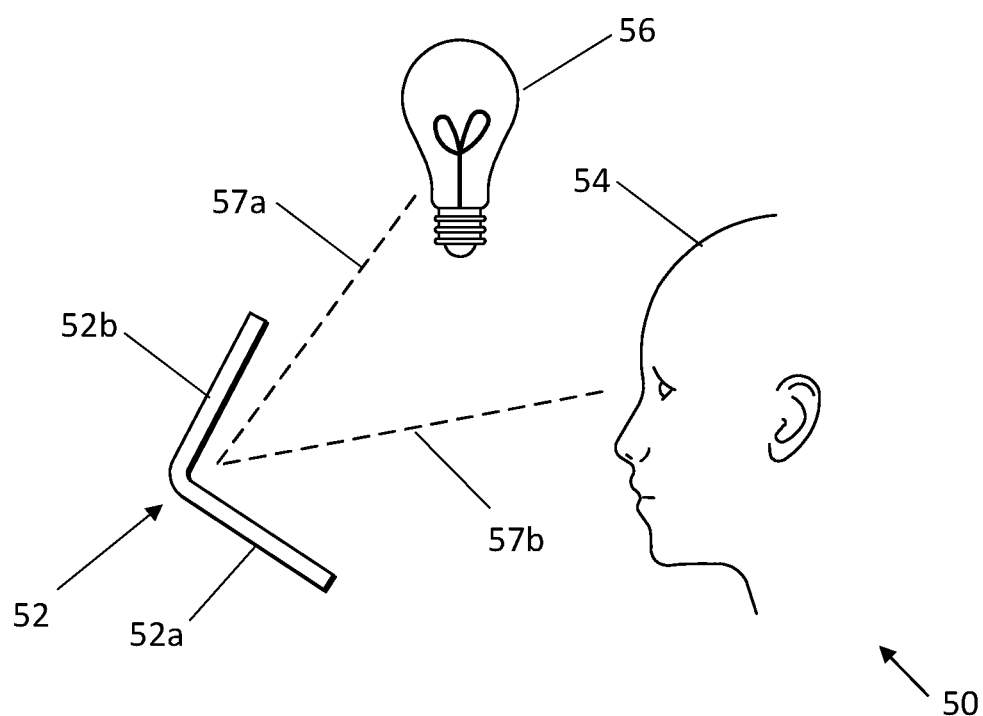
FIG. 5 is a block diagram of a system in accordance with an example embodiment.

FIG. 5 is a block diagram of a system, indicated generally by the reference numeral 50, in accordance with an example embodiment. The system 50 includes a user device screen 52 comprising a first display segment 52a and a second display segment 52b that can be folded relative to one another. A light source 56 is shown in the scene around in user device 52. Reflections from the light source 56 are visible to a user 54 due to reflections from the display 52 (as indicated by the dotted lines 57a and 57b). The light source 56 is positioned such that were there no crease area, reflections of the light source would not be visible to the user 54.

As is readily apparent from the system 50, as the angle between the first and second displays of the user screen 52 changes, the light sources and objects that might potentially be visible to the user 54 can change.

Figure 6:
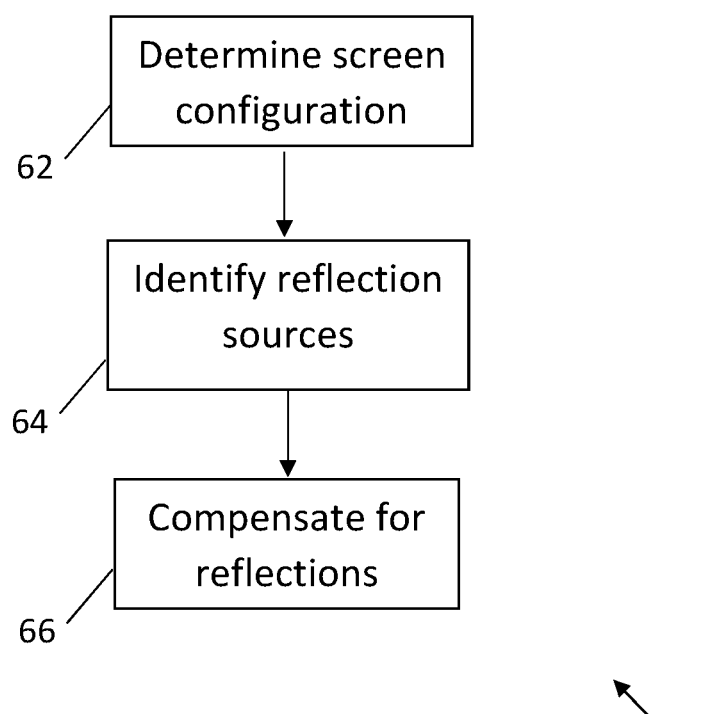
FIG. 6 is a flow chart showing an algorithm in accordance with an example embodiment.

FIG. 6 is a flow chart showing an algorithm, indicated generally by the reference numeral 60, in accordance with an example embodiment.

The algorithm 60 starts at operation 62, where a configuration of a reconfigurable screen of a user device (such as the user device 52) is determined. Different configurations (e.g. fold angles) may cause geometric distortions to certain areas of the screen. Such geometric distortions may therefore be determined as a result of determining said configuration.

In the context of the system 50, the operation 62 may determine a fold angle between the first and second display segments of the user device screen 52. Changing the fold angle changes the nature of the geometric distortion of the screen in the area of a hinge between the displays in a way that may be predictable. Sensors may be provided for determining the fold angle.

At operation 64, potentially problematic sources of reflection (such as the light source 56) are identified from a scene around the user device. For example, one or more imaging devices (such as cameras) may be used to determine illumination sources and/or objects in the vicinity of a user device screen and potentially problematic reflection areas of the screen may be determined based on the locations of those illumination sources/objects and the relative angle of the user.

At operation 66, compensation is performed for said potentially problematic sources of reflection identified in the operation 64.

Undesirable scene reflections occurring due to distorted areas of a flexible screen may be compensated by using knowledge of the current screen orientation to calculate the distorted shape of certain screen areas, and using that shape to calculate the appropriate light source directions to compensate for, along with the geometrical distortions on those sources. As discussed further below, the directional calculation may also be enhanced using user gaze measurements, such that the relative position between the user's gaze point and the distorted screen area may be used in calculating the light sources requiring correction and in calculating a compensating pattern to display.

Figure 7:
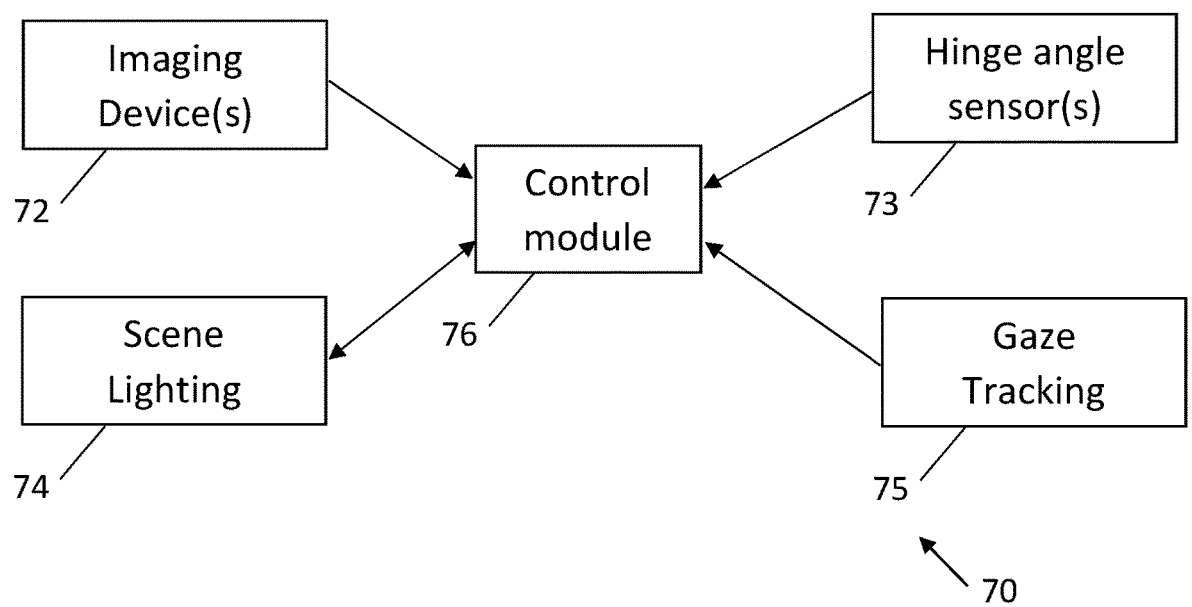
FIG. 7 is a block diagram of a system in accordance with an example embodiment.

FIG. 7 is a block diagram of a system, indicated generally by the reference numeral 70, in accordance with an example embodiment. The system 70 may be used to implement the algorithm 60 described above.

The system 70 comprises imaging device(s) 72, hinge angle sensor(s) 73, a scene lighting module 74, a gaze tracking module 75 and a control module 76. The control module 76 may be used to implement the operation 66 of the algorithm 60 by compensating for reflections of a device having a reconfigurable screen.

The imaging device(s) 72 (e.g. one or more cameras) provide images of a user and a scene to the control module 76.

The one or more hinge angle sensors 73 are used to measure the angle between first and second display segments of the user device screen. For example, some foldable mobile phones include angle sensing hardware to which applications can connect via a suitable application programming interface.

The scene lighting module 74 is used to estimate the position(s) of light sources within a scene based, at least in part, on data from the imaging device(s) 72. In one example, the scene lighting module may determine the relative directions of light sources within the scene by directly analysing image data from the imaging device(s) 72 and calculating their angle to the device via known image analysis techniques. Alternatively, or in addition, the scene lighting module may locate light sources in the scene by analysis of images of the user captured by the imaging device(s). For example, the scene lighting module may include algorithms for performing corneal reflection imaging from images of the user's eyes, in which reflections of light sources from the scene are likely to be captured. The relative angle between the light sources and the device may then be calculated by knowledge of the spherical shape of the user's cornea and the angle to the user. This second example is likely to be advantageous where the field of view (FOV) of the imaging device(s) is insufficient to directly capture all light sources from a scene.

The gaze tracking module 75 is used to estimate the user's gaze point on the screen. The gaze tracking module may, for example, estimate the user's gaze point by real time image analysis of images of the user captured by the imaging device(s) 72. For example, known techniques (e.g. neural network models) may be employed to segment the images of the user to determine landmarks such as eye corners and/or iris positions. The change in position of these landmarks may be input to a further software model to calculate the user's gaze position on the screen. These techniques may optionally be improved via a distance measurement to the user (e.g. via range-finding sensors on the device), and also optionally may be subject to generic and/or individual user calibration procedures.

The gaze tracking module 75 may be used to determine a gaze direction of a viewer of the screen of the user device. For example, the relative position between the user's gaze point and a distorted screen area can be used in the determination (by the control module 76) of the light sources that require correction and the compensation required.

The control module 76 may implement a specular correction algorithm for calculating appropriate correction patterns to apply to the screen. The control module 76 may compensate for potentially problematic sources of reflection based, at least in part, on the determined user gaze direction. Example compensations include selective dimming, relighting and/or recolouring areas of the screen within or outside the distorted area. For example, where a problematic reflection source is identified having a particular colour and calculated light intensity at the screen plane, the remainder of the screen may be recoloured and its brightness increased such that the reflected object appears to blend in to the newly altered background of the screen. Alternatively, or in addition, shapes of detected reflection sources may be distorted from their "true" shape to match the distortion associated with a hinge position.

By way of example, where scene objects are reflected within the crease area, the reflection of the objects may be distorted away from their true shapes due to the distorted shape of the screen within the crease area. This distortion can be calculated by knowledge of the hinge angle and model-specific crease properties of the device, and the correction above may be applied taking into account this distorted shape rather than the object's original shape. Optionally, the distorted screen shape may also be used to apply corrections to displayed objects on the screen.

Figure 8:
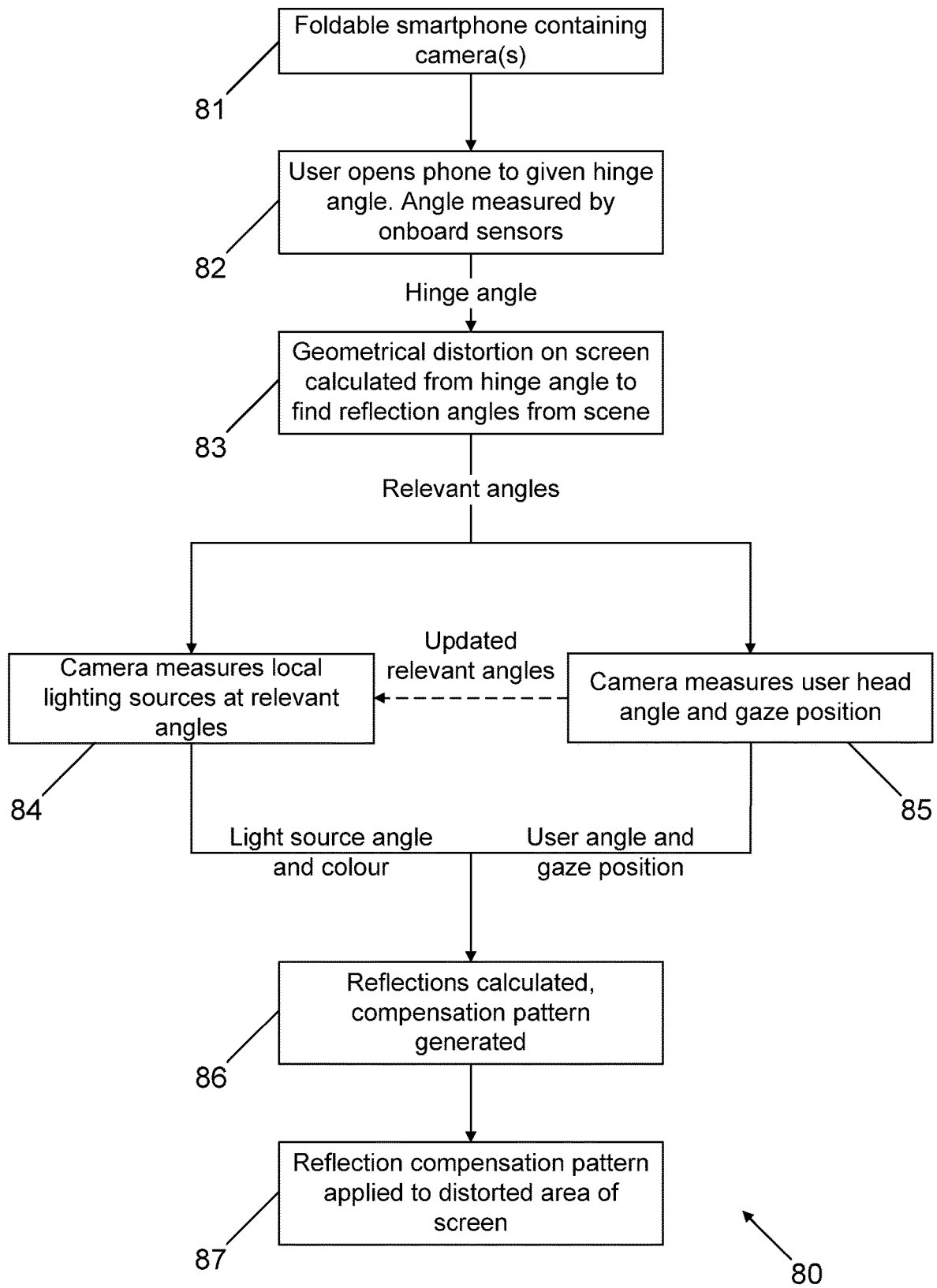
FIG. 8 is a flow chart showing an algorithm in accordance with an example embodiment.

FIG. 8 is a flow chart showing an algorithm, indicated generally by the reference numeral 80, in accordance with an example embodiment.

The algorithm 80 starts at operation 81, where a user uses a user device (e.g. a foldable smartphone) containing one or more cameras. The camera(s) can be used to image lighting sources and objects in a scene so that the angles of the lighting sources/objects can be determined relative to the user device. The camera(s) can also be used to image the user to estimate the position and gaze angle of the user relative to the screen of the user device.

At operation 82, sensors of the user device are used to determine a hinge angle of the user device.

The determined hinge angle is used in operation 83 to determine a geometric distortion on the screen. The geometric distortion is used to determine reflection angles of the scene that can be used to determine lighting sources and objects (for example, as captured by the camera(s)) that may cause problematic reflections. In one example embodiment, the geometric distortion is retrieved from a database based on the hinge angle.

The geometric distortion may, for example, be measured (in advance) for a particular device model as a function of hinge angle as a one-time activity (e.g. by the manufacturer), and the data stored in an on-device database or lookup table which relates the measured hinge angle to distortion angles. Relevant factors that may be considered include the height of the crease above the screen plane, and the location of 'peaks' in the screen, as a function of hinge angle. Alternatively, where such a database does not exist, the user device may estimate the distortion using a physical model relating the material properties of the flexible screen, its known fixation points on either side of the hinge, and the measured hinge angle to expected distortion.

At operation 84, a scene lighting algorithm (which may be implemented by the scene lighting module 74 described above) filters the possible light sources from the scene which match the range of acceptance angles associated with the particular distortion (the "specular reflections"), and communicates information such as the positions, shapes, colours, and other data relating to the specular reflections to a specular correction algorithm (which may be implemented by the control module 76 described above).

At operation 85, a gaze tracking algorithm (which may be implemented by the gaze tracking module 75 described above) measures the location of the user relative to the device and the location of the user's gaze point on the screen relative to the distortion (the "gaze angle"), and further modifies the acceptance angle and choice of specular reflections.

At operation 86, a compensation pattern is generated. For example, based on the measured distortion, the gaze angle, and the specular reflections, the specular correction algorithm may calculate a compensation pattern which can be applied to the screen within the distortion area, when the gaze angle is within an appropriate range. An example of a suitable pattern may be selectively dimming or recolouring areas of the screen within or outside the distorted area to compensate for the colour and location of the measured specular reflections.

The compensation pattern may be suitably distorted from the 'true' shapes of the specular reflections to match the distortion associated with the current hinge angle.

At operation 87, the compensation pattern generated in the operation 86 is applied to the screen of the user device.

Figure 9:
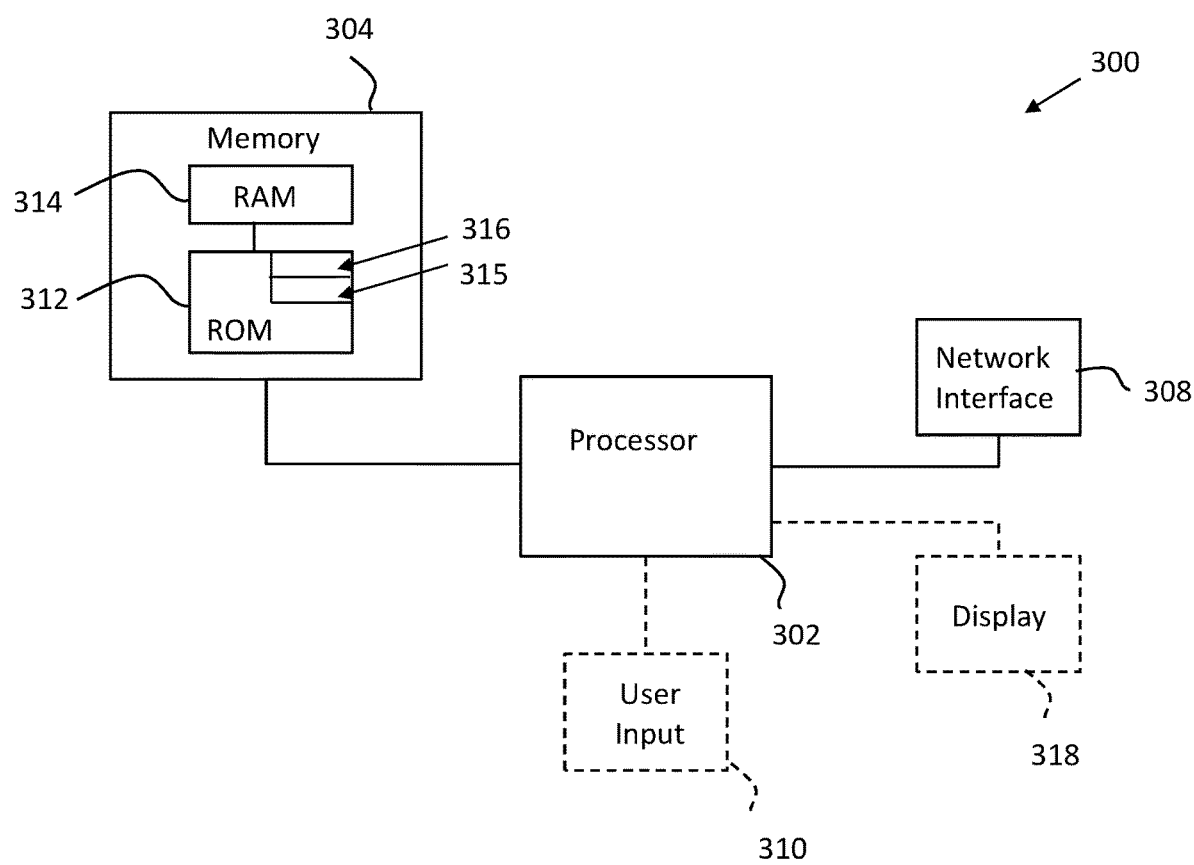
FIG. 9 is a block diagram of components of a system in accordance with an example embodiment.

For completeness, FIG. 9 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The network/apparatus interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 40, 60 and 80 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size.

In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 10A:
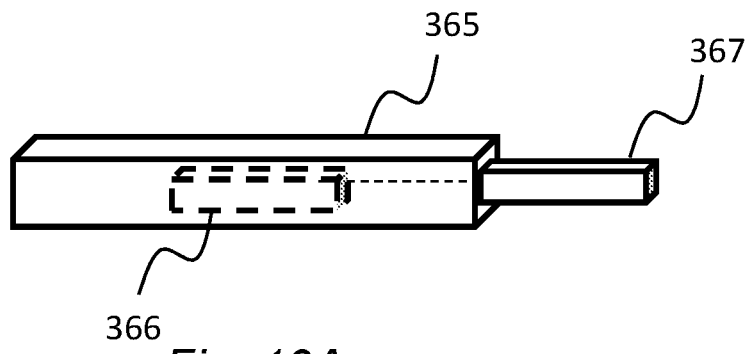
FIGS. 10A and 10B show tangible media, respectively a removable non-volatile memory unit and a compact disc (CD) storing computer-readable code which when run by a computer perform operations according to example embodiment.
Figure 10B:
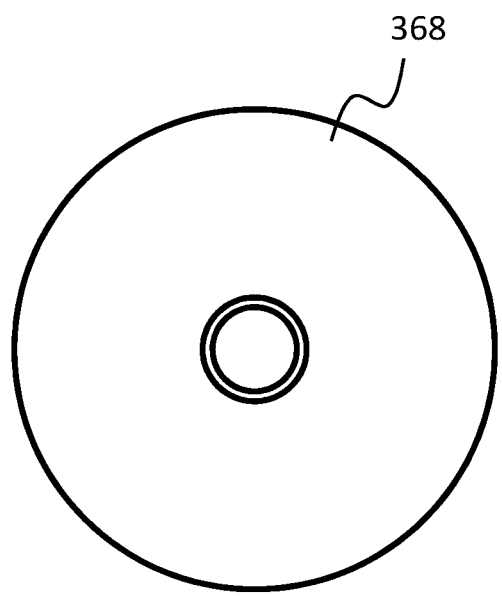

FIGS. 10A and 10B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 4, 6 and 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one processor; and
at least one memory including computer program code,
the at least one memory storing instructions that, when executed by the at least one processor, cause the apparatus at least to:
determine a configuration of a reconfigurable screen of a user device;
based, at least in part, on the determined configuration, identify one or more potentially problematic sources of reflection from a scene around the user device that cause one or more potentially problematic reflection areas of the reconfigurable screen;
determine a distorted shape of the one or more potentially problematic reflection areas based on the determined configuration of the screen; and
compensate for the one or more potentially problematic sources of reflection by applying a compensation pattern that selectively adjusts one or more display characteristics of portions of the screen based on the determined distorted shape of the one or more potentially problematic reflection areas.

2. The apparatus as claimed in claim 1, wherein the configuration of the reconfigurable screen comprises a fold angle of the screen.

3. The apparatus as claimed in claim 1, wherein determining said one or more potentially problematic sources of reflection comprises:
based on the determined configuration, determining or retrieving geometric distortion information for the screen.

4. The apparatus as claimed in claim 1, wherein the at least one memory and the instructions stored therein are configured to, with the at least one processor, further cause the apparatus to:
determine at least one of: one or more illumination sources that impact on the screen or objects that impact on the screen,
wherein identifying said one or more potentially problematic sources of reflection is further based, at least in part, on one or more respective locations of the determined at least one of: one or more illumination sources or objects.

5. The apparatus as claimed in claim 4, wherein the at least one memory and the instructions stored therein are configured to, with the at least one processor, further cause the apparatus to:
based, at least in part, on the one or more respective locations of the determined at least one of: one or more illumination sources or objects, identify the one or more potentially problematic reflection areas of the screen.

6. The apparatus as claimed in claim 4, further comprising one or more imaging devices configured to determine the at least one of: one or more illumination sources or objects.

7. The apparatus as claimed in claim 4, wherein the at least one memory and the instructions stored therein are configured to, with the at least one processor, cause the apparatus to:
determine said at least one of: one or more illumination sources or objects by performing corneal reflection imaging.

8. The apparatus as claimed in claim 4, wherein the at least one memory and the instructions stored therein are configured to, with the at least one processor, further cause the apparatus to:
determine at least one of an angle or a colour of illumination of the determined at least one of: one or more illumination sources or objects relative to the screen for use in at least one of identifying said one or more potentially problematic sources of reflection or for use in compensating for said one or more potentially problematic sources of reflection.

9. The apparatus as claimed in claim 1, wherein compensation for said one or more potentially problematic sources of reflection comprises specular reflection correction.

10. The apparatus as claimed in claim 1, wherein the at least one memory and the instructions stored therein are configured to, with the at least one processor, further cause the apparatus to:
determine a gaze direction of a viewer of the screen of the user device.

11. The apparatus as claimed in claim 10, wherein identifying said one or more potentially problematic sources of reflection is further based, at least in part, on the determined gaze direction.

12. The apparatus as claimed in claim 10, wherein the at least one memory and the instructions stored therein are configured to, with the at least one processor, further cause the apparatus to:
determine a compensation for said one or more potentially problematic sources of reflection based, at least in part, on the determined gaze direction.

13. A user device comprising a reconfigurable screen and an apparatus, wherein the apparatus comprises:
at least one processor; and
at least one memory including computer program code, the at least one memory storing instructions that, when executed by the at least one processor, cause the apparatus at least to:
determine a configuration of the reconfigurable screen of the user device;
based, at least in part, on the determined configuration, identify one or more potentially problematic sources of reflection from a scene around the user device that cause one or more potentially problematic reflection areas of the reconfigurable screen;
determine a distorted shape of the one or more potentially problematic reflection areas based on the determined configuration of the screen; and
compensate for the one or more potentially problematic sources of reflection by applying a compensation pattern that selectively adjusts one or more display characteristics of portions of the screen based on the determined distorted shape of the one or more potentially problematic reflection areas.

14. A method comprising:
determining a configuration of a reconfigurable screen of a user device;
based, at least in part, on the determined configuration, identifying one or more potentially problematic sources of reflection from a scene around the user device that cause one or more potentially problematic reflection areas of the reconfigurable screen;
determining a distorted shape of the one or more potentially problematic reflection areas based on the determined configuration of the screen; and
compensating for the one or more potentially problematic sources of reflection by applying a compensation pattern that selectively adjusts one or more display characteristics of portions of the screen based on the determined distorted shape of the one or more potentially problematic reflection areas.

15. The method as claimed in claim 14, wherein the configuration of the reconfigurable screen comprises a fold angle of said screen.

16. The method as claimed in claim 14, wherein determining said one or more potentially problematic sources of reflection comprises:
based on the determined configuration, determining or retrieving geometric distortion information for the screen.

17. The method as claimed in claim 14, further comprising:
determining at least one of: one or more illumination sources that impact on the screen or objects that impact on the screen,
wherein identifying said one or more potentially problematic sources of reflection is further based, at least in part, on one or more respective locations of the determined at least one of: one or more illumination sources or objects.

18. A non-transitory computer readable medium comprising program instructions stored thereon for causing an apparatus to perform at least the following:
determine a configuration of a reconfigurable screen of a user device;
based, at least in part, on the determined configuration, identify one or more potentially problematic sources of reflection from a scene around the user; device that cause one or more potentially problematic reflection areas of the reconfigurable screen;
determine a distorted shape of the one or more potentially problematic reflection areas based on the determined configuration of the screen; and
compensate for the one or more potentially problematic sources of reflection by applying a compensation pattern that selectively adjusts one or more display characteristics of portions of the screen based on the determined distorted shape of the one or more potentially problematic reflection areas.

19. The non-transitory computer readable medium of claim 18, wherein determining said one or more potentially problematic sources of reflection comprises:

based on the determined configuration, determining or retrieving geometric distortion information for the screen.

20. The non-transitory computer readable medium of claim 18, wherein the program instructions are further configured to cause:
determining at least one of: one or more illumination sources that impact on the screen or objects that impact on the screen,
wherein identifying said one or more potentially problematic sources of reflection is further based, at least in part, on one or more respective locations of the determined at least one of: one or more illumination sources or objects.

21. An apparatus comprising:
at least one processor; and
at least one memory including computer program code, the at least one memory storing instructions that, when executed by the at least one processor, cause the apparatus at least to:
determine a configuration of a reconfigurable screen of a user device;
based, at least in part, on the determined configuration, identify one or more sources of reflection from a scene around the user device that cause one or more Potentially problematic reflection areas of the reconfigurable screen;
determine a distorted shape of the one or more potentially problematic reflection areas based on the determined configuration of the screen;
determine a gaze direction of a viewer of the screen of the user device;
based, at least in part, on the determined gaze direction of the viewer, determine a compensation for the one or more sources of reflection; and
perform the determined compensation for the one or more sources of reflection by applying a compensation pattern that selectively adjusts one or more display characteristics of portions of the screen based on the determined distorted shape of the one or more potentially problematic reflection areas.

22. An apparatus comprising:
at least one processor; and
at least one memory including computer program code, the at least one memory storing instructions that, when executed by the at least one processor, cause the apparatus at least to:
determine a configuration of a reconfigurable screen of a user device;
based, at least in part, on the determined configuration, determine or retrieve geometric distortion information indicative of an angle from which a light source is reflected towards a viewer of the screen of the user device, from a scene around the user device;
determine a distorted shape of the one or more potentially problematic reflection areas based on the determined configuration of the screen; and
compensate for the light source by applying a compensation pattern that selectively adjusts one or more display characteristics of portions of the screen based on the determined distorted shape of the one or more potentially problematic reflection areas.

* * * * *